Oct. 3, 1967  H. GREITZER  3,344,906
CONVEYOR
Filed Aug. 9, 1965  2 Sheets-Sheet 1
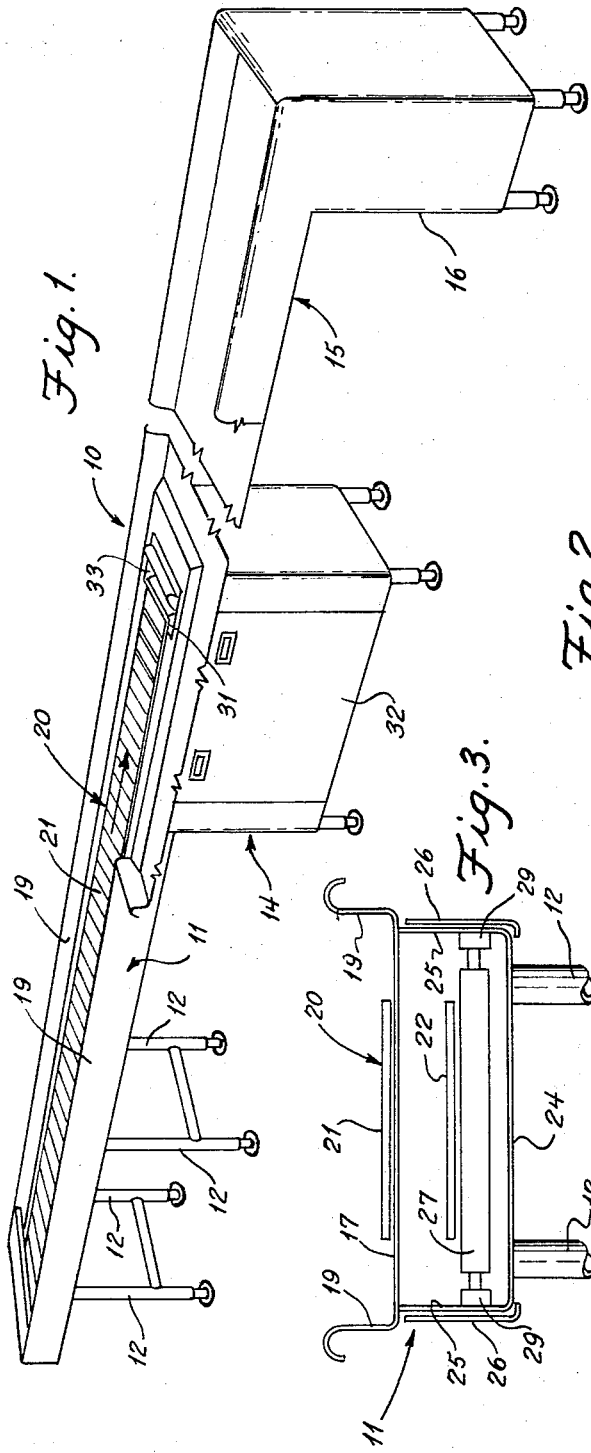
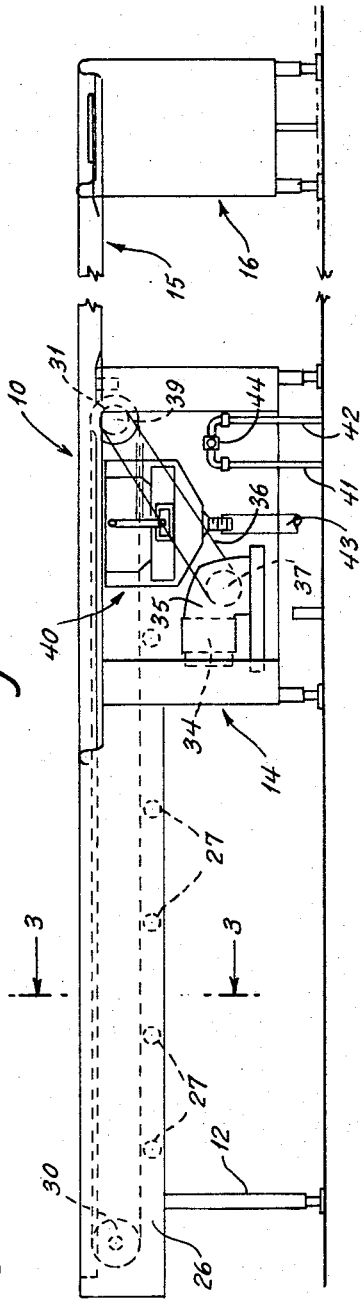
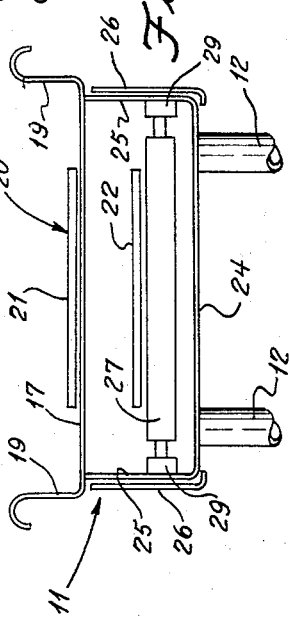
INVENTOR.
HARRY GREITZER
BY
Albert M. Parker
ATTORNEY.

Oct. 3, 1967   H. GREITZER   3,344,906
CONVEYOR
Filed Aug. 9, 1965   2 Sheets-Sheet 2
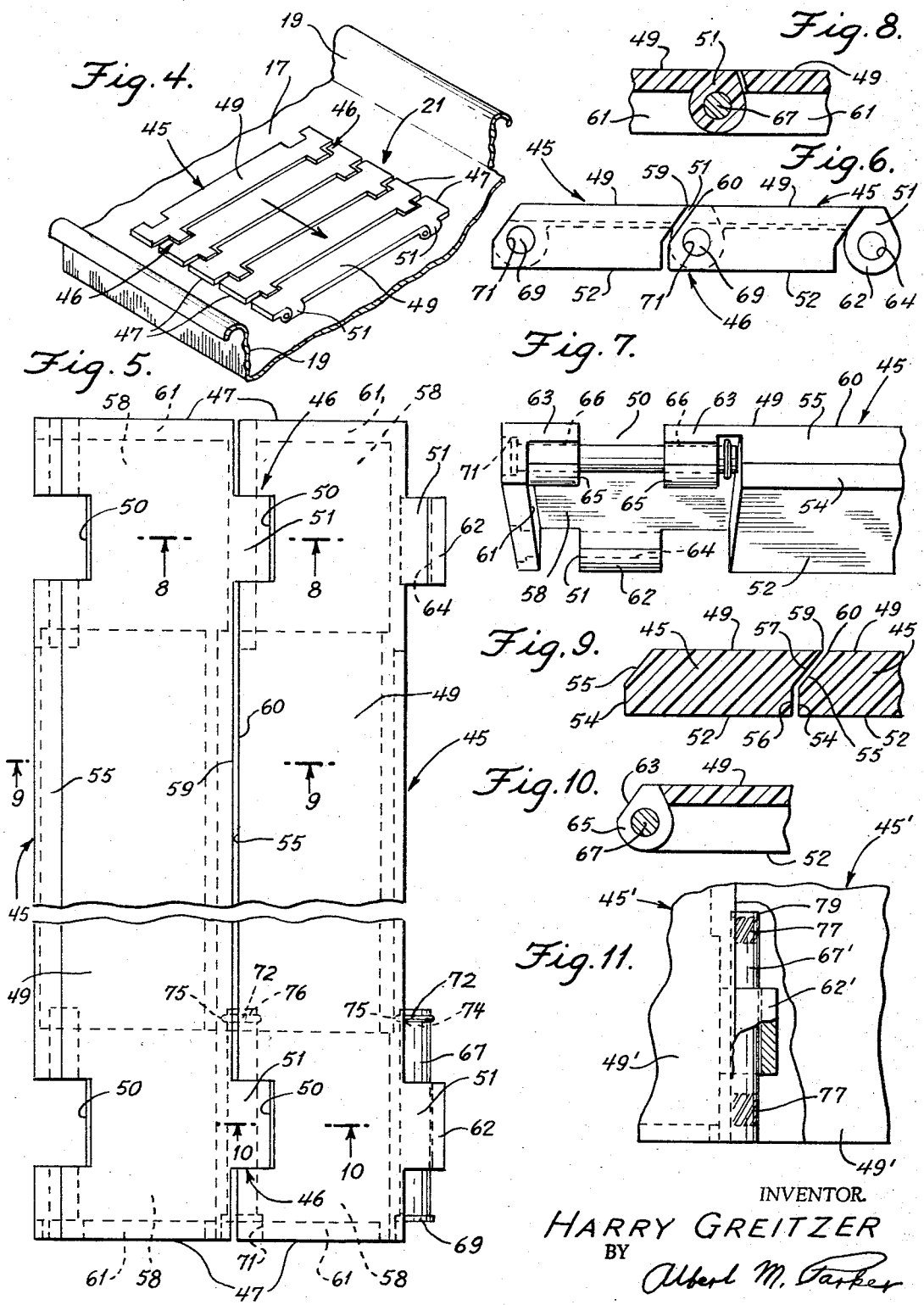
INVENTOR.
HARRY GREITZER
BY Albert M. Parker
ATTORNEY.

United States Patent Office 3,344,906
Patented Oct. 3, 1967

3,344,906
CONVEYOR
Harry Greitzer, Port Chester, N.Y. (% Greitzer-Crouse, Inc., 295 Duffy Ave., Hicksville, N.Y. 11801)
Filed Aug. 9, 1965, Ser. No. 478,232
3 Claims. (Cl. 198—195)

This invention relates to a conveyor, such conveyor being adapted for use, for example, in transporting dishes, trays, food, and the like as in restaurants and other food dispensing establishments.

It is highly important with conveyors adapted to convey food, food-containing utensils, and the like that such conveyors should be readily capable of sterilization in all of their parts which contact or come close to the food and food-containing utensils. Previous conveyors adapted for such use have left much to be desired as to their ease of cleaning and sterilization, since, in the main, in the operative run of the conveyor belt the food or utensil-bearing portion of the conveyor was not isolated from the remainder of the conveyor, including the means for driving the belt. In a typical prior conveyor of the food-conveying type, the elongated table over which the operative run of the conveyor belt travelled was centrally apertured to provide for the passage of the means linking the parts of the joined conveyor belt together and driving and guiding the conveyor belt at its ends. Such conveyor thus permitted ready access to the operative run of the conveyor belt by dirt, germs, and so forth from below the belt throughout a substantial part of its extent. In contrast thereto, the conveyor in accordance with the present invention is provided with an elongated table supporting the operative run of the belt, such table being substantially flat and imperforate throughout its extent with the exception of the zones at the ends of the belt wherein it is diverted from its inoperative to its operative run and vice versa and is driven. In the disclosed embodiment of the conveyor the main horizontal portion of such table is flat and the portions of the conveyor elements which rest thereupon are generally flat so that both are readily cleanded and present few nooks or crannies wherein dirt or germs may lodge.

It is accordingly among the objects of the invention to provide a novel conveyor of the type indicated which is particularly easy to clean and sterilize.

A further object of the invention is to provide a novel conveyor employing a driven endless belt wherein the operative run of the belt is supported upon and runs over an elongated imperforate table.

Yet another object of the invention lies in the provision of an endless conveyor belt which is composed of a plurality of slat-like elements which are formed and hingedly connected together in a novel manner.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in perspective of an illustrative conveyor system incorporating a novel conveyor belt and supporting table therefor in accordance with the present invention, the table at the delivery end of the conveyor being foreshortened for economy of space and a portion of the side delivery apron of the table likewise being removed;

FIG. 2 is a view in side elevation of the conveyor system of FIG. 1, the conveyor table being foreshortened as in FIG. 1 and the front door of the cabinet containing the driving and belt washing means of the conveyor system being removed;

FIG. 3 is a fragmentary view in vertical sections through the conveyor belt and its supporting means, the section being taken along the line 3—3 of FIG. 2 looking in the direction of the arrows;

FIG. 4 is a fragmentary view in perspective of a portion of the upper operative run of the conveyor belt and of the horizontal table at the run of the belt;

FIG. 5 is a view in plan of two successive ones of the hingedly connected slat-like members which make up the conveyor belt;

FIG. 6 is a view in end elevation of the slat-like members shown in FIG. 5, the view being taken in a direction from bottom to top in FIG. 5;

FIG. 7 is a fragmentary view in perspective of a slat-like member at one end of its trailing edge showing the hinge means by which it is joined to the next adjacent member;

FIG. 8 is a fragmentary view in vertical section through one of the hinge connections between two successive slat-like members, the section being taken along the line 8—8 of FIG. 5 looking in the direction of the arrows;

FIG. 9 is a view in vertical section through an intermediate portion of one of the slat-like members and a part of the next adjacent member which leads it in the conveyor belt, the section being taken along the line 9—9 of FIG. 5 looking in the direction of the arrows;

FIG. 10 is a fragmentary view in vertical section taken through the trailing edge of a slat-like member intermediate the length of the hinge-forming portion thereof, the section being taken along the line 10—10 of FIG. 5 looking in the direction of the arrows; and FIG. 11 is a fragmentary view in plan of a second embodiment of slat-like member for use in the conveyor belt of the invention, a portion of the hinge-forming part of such member being broken away in order better to illustrate the pintle pin employed with such second embodiment.

The conveyor system shown in FIGS. 1 and 2 is generally designated by the reference character 10. Such system includes an elongated horizontal table portion 11 at the left, such table portion including and supporting an endless belt conveyor generally designted 20. The system also includes an extension table 15 supported on a cabinet-like means 16, the extension 15 forming a support for articles discharged from the conveyor 20, the operative run of which travels in the direction from left to right in FIGS. 1 and 2. The table portion 11 is supported at its left-hand end by a plurality of sets of supporting legs 12 and at its right-hand end by a frame enclosed to form a cabinet 14 and housing means to be described for driving and washing the conveyor belt.

The table portion 11 has an upper part having an elongated upper flat surface 17 and two upstanding vertical side members 19 which prevent articles on the conveyor belt from falling off the table. Preferably, as shown, the portions 17 and 19 of the table are formed of an integral sheet of metal which may be made, for example, of stainless steel or Monel metal. The belt of the conveyor 20 has the upper run 21 thereof supported directly upon the upper surface of the table portion 17, as shown in FIG. 3; the lower, inoperative run of the conveyor belt, which is designated 22, travels in a reverse direction beneath the table portion 17, likewise as shown in FIG. 3. Table portion 17 forms the upper wall of a box-like structure likewise made of sheet metal, such structure having a bottom 24 and spaced parallel front and rear sides 25. Preferably, as shown, the box-like structure is provided with front and rear trim panels 26 which may be removed, for example, in servicing the system. The inoperative, return run 22 of the conveyor belt is supported upon idle rolls 27 which are spaced at intervals longitudinally of the table 11 and extend between the sides 25 thereof, the ends of the axles of such rolls being journalled in pillow blocks 29 which are affixed to the sides 25.

The conveyor chain 20 is guided at its left-hand end (FIGS. 1 and 2) by an idle roll 30 over which it travels from its lower inoperative run into its operative run and by a driven roller 3 at its right-hand exit end. Such rollers may, if desired, have shallow outwardly projecting annular flanges on their opposite ends which substantially engage the opposite end surfaces 47 of the slat-like members 45 of the conveyor chain, in order to center the chain on the upper table surface 17. It has been found sufficient, however, to make such rollers 30 and 31 of circular cylindrical shape and to guide the conveyor chain as by side guide surfaces of which one is shown at 33 in FIG. 1 at the openings through the table top 17 at the location of the rollers 30 and 31.

The roller 31 is driven so as to impel the upper run 21 of the conveyor chain to the right by means of an electric motor 34 supported within the cabinet 14. Such motor drives through a speed-reducing gear unit 35, a drive chain 36 connecting the driving sprocket 37 of the speed reducer 35 and a sprocket 39 affixed to the shaft bearing the roller 31. Within the cabinet 14 there is also located a belt washer 40 which is supplied with cold and hot water through pipes 40 and 41, respectively, the water being mixed at a monitoring mixing valve 44 through which it is delivered to the belt washer. The belt washer is in the form of a hood through which the lower run of the belt passes after leaving roller 31. Within the hood are a plurality of spray nozzles (not shown) which direct sprays of water into the belt and thus dislodge any foreign particles thereon. The bottom of the hood is in the form of a sump through which water and such dislodged particles are delivered to a drain pipe 43.

The shape of the slat-like members 45 which are hingedly connected together to form the conveyor chain and the structure of such hinged connections or joints 46 are shown more particularly in FIGS. 4–10, inclusive. The opposite end surfaces 47 of the members 45, which have above been referred to as performing a guiding function for the chain in cooperation with the guides 33, are flat and extend longitudinally in vertical planes in the upper run 21 of the conveyor chain. Members 45 have flat upper surfaces 49, the upper surfaces of successive members 45 lying close together so that the operative run of the chain presents a substantially flat upper surface. The hinged joints 46 between successive members 45 are formed by forwardly projecting knuckles 51 disposed on the leading edge of each of such members and projecting therefrom, the knuckles 51 being accurately received within correspondingly located slots or cut out portions 50 in the trailing edge of the next successive leading member 45. The knuckles 51 are connected to such next member 45 in a manner to be described.

As is shown in FIGS. 5–10, inclusive, the main bottom surface of each of the slat-like members 45, including the side edge portions 61, lies in a plane parallel with the upper surface 49 thereof. Thus the members 45 have broad bearing surfaces with the upper surface of the table 17. The leading and trailing edges of the members 45 are formed so that they have a partially telescopic relationship and minimize the possibility of having tableware or the like caught between or slip down through the space between successive members 45. Thus the lower portion 54 of the trailing edge of each member 45 lies vertical and closely confronts a similar vertical transverse surface 56 at the lower portion of the leading end of the next, trailing member 45. Above the surfaces 54 and 56, which in the illustrative embodiment are of somewhat less height than one-half the thickness of members 45, the confronting trailing and leading edge portions 55 and 57, respectively, of successive members 45 are inclined upwardly and forwardly at a substantial angle with respect to the horizontal and closely confront each other. As a result of such configuration of the confronting edge surfaces of successive members 45, it is virtually impossible for even small articles to find their way between the upper edges 59 and 60 of the successive slat-like members 45 and down through the upper run of the conveyor belt. Such configurations, however, do not interfere with the pivoting of successive members 45 with respect to each other as they travel about the rollers 30 and 31.

At the locations of the hinged connections 46 between members 45, such members 45 are of reduced thickness, as indicated at 58 in FIGS. 5, 6, 8, and 10 and as particularly well shown in FIG. 7. The side edges of members 45 or also of full thickness, as shown at 61 in FIGS. 5 and 7. The knuckles 51 which are located centrally of the zones 58 transversely thereof are provided at their outer ends with rounded bodies 62 which have central bores 64 therethrough. The portions 63 at the trailing edge of each member 45 which laterally border the slots 50 therein are provided with partially rounded bosses 65 provided with bores 66 therein. At each hinged connection 46 a pintle pin 67 is disposed within the bores 64 and 65 so as hingedly to connect successive members 45 together.

The pintle pins 67, which may be made of stainless steel, are retained in position in the manner more clearly shown at the lower end of FIG. 5. Each pin has an enlarged head 69 on its outer end, such head being received within a counterbore or pocket 71 which extends inwardly from the side surface 47 of the member adjacent the trailing edge thereof. Adjacent its inner or forward end the pintle pin 67 has an annular groove 74 which receives a spring ring 72 therein, likewise made of corrosion resistant metal. Ring 72 is partially received within a pocket 75 on the leading edge of member 45 and partially within a pocket 76 in the trailing edge of the next leading member 45. The construction of the parts is such that with the spring ring 72 mounted in the groove 74 on pin 67 the pin may be thrust inwardly into its assembled position in bores 64 and 65, the ring snapping into the pockets 75 and 76 when the pin reaches its fully assembled position.

In FIG. 11 there is shown an alternative construction of pintle pin, there designated 67', for hingedly connecting together successive slat-like members 45' of which corner portions of successive members are shown. The pin 67' is provided adjacent its opposite ends with helical ribs 77. The forward or inner end of the pin 67' is bevelled as shown at 79. In assembling members 45' to form a conveyor chain in accordance with the construction of FIG. 11 the pintle pins 67' are forced through the bores in the hinge-forming parts of successive members, the ribs 77 cutting matingly shaped grooves in the bores 66' of the bosses 65'. The bore may be made with a diameter slightly larger than that of 66', whereby the ribs 77 may pass therethrough without cutting or scoring the surface thereof.

The slat-like members 45 and 45' forming the two disclosed embodiments of conveyor chain may be made of a number of suitable materials. It is presently preferred, however, to make such members of plastic material such as acetal resins. A suitable resin of this type is one made by E. I. du Pont de Nemours & Co. under the trademark "Delrin." Such resin, which is in the form of a polymer composed of a large number of linear unbranched polyoxymethylene chains, possesses a high tensile strength and is resistant to high temperatures and moisture.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. A conveyor adapted for use in restaurants and the like, comprising a support having an elongated at least substantially flat, generally horizontal, substantially imperforate upper surface, an endless conveyor belt having an extended upper operative run and a lower return run, said conveyor belt being composed of a plurality of hingedly connected transversely disposed slat-like members, the predominant part of the lower surface of each such member being flat, the upper surface of each of the slat-like members being flat and lying parallel to the flat main portion of the lower surface of such member, the hinged connections between successive slat-like members comprising laterally spaced knuckles on one of each successive pair of slat-like members projecting longitudinally of the conveyor belt, grooves in the confronting edge of the other member of said pair receiving said knuckles, and transversely disposed pintle pins extending through said knuckles into the portions of the slat-like member bearing said grooves, there being at least two knuckle and groove hinged connections between each pair of slat-like members, said hinged connections being disposed adjacent but spaced inwardly of opposite lateral edges of said members, the lower surfaces of the knuckles and the lower surfaces of the portions of the slat-like members bearing said grooves lying in the plane of said flat main lower surface of the respective slat-like member, said members, at the location of said hinged connections, being of reduced thickness, the upper surface of each member at the location of said hinged connections being flat and disposed in the plane of the flat upper main surface of the member, the knuckle and groove-bearing portions of the member being in the form of partially rounded bosses having lower surfaces lying in the plane of the flat main lower surface of the member, the hinged connections between successive slat-like members in the operative run of the conveyor belt lying wholly between the planes of the upper and lower surfaces of the slat-like members in such operative run, the flat lower surface of each of the slat-like members in said upper, operative run of the conveyor belt resting upon and being supported by the upper surface of the support, means for guiding said belt into its return run and from the return run into the operative run thereof, and means for driving the conveyor belt.

2. A conveyor as claimed in claim 1, comprising parallel vertical flanges on the ends of the slat-like members, said flanges extending transversely of the length of the members throughout substantially the full width thereof, the lower edges of the flanges lying in the plane of the flat main lower surface of the member.

3. A conveyor as claimed in claim 2, wherein the outer boss of the groove-bearing portion of each slat-like member lies laterally inwardly of the respective flange and is integrally connected to such flange.

References Cited

UNITED STATES PATENTS

| | | | |
|---|---|---|---|
| 1,136,578 | 4/1915 | Ayres | 198—195 |
| 1,986,950 | 1/1935 | Vandegrift | 198—195 X |
| 2,271,436 | 1/1942 | Lathrop. | |
| 2,523,829 | 9/1950 | Hubbell | 198—204 X |
| 2,693,268 | 11/1954 | Ball | 198—195 X |
| 2,911,091 | 11/1959 | Imse | 198—189 |
| 3,036,695 | 5/1962 | Thuerman | 198—189 |

FOREIGN PATENTS 331,678 10/1918 Germany.

EVON C. BLUNK, *Primary Examiner.*

R. J. HICKEY, *Assistant Examiner.*